US006809152B2

(12) United States Patent
Harris et al.

(10) Patent No.: US 6,809,152 B2
(45) Date of Patent: Oct. 26, 2004

(54) GOLF BALL COVER WITH SEGMENTED POLYURETHANE

(75) Inventors: Kevin M Harris, New Bedford, MA (US); Murali Rajagopalan, South Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 79 days.

(21) Appl. No.: 10/274,800

(22) Filed: Oct. 21, 2002

(65) Prior Publication Data

US 2003/0078342 A1 Apr. 24, 2003

Related U.S. Application Data

(60) Provisional application No. 60/346,226, filed on Oct. 22, 2001.

(51) Int. Cl.[7] ............................ A63B 37/12; C08G 18/44
(52) U.S. Cl. ...................... 525/130; 525/127; 525/129; 525/261; 528/28; 528/70; 528/76; 473/365; 473/374; 473/378
(58) Field of Search ................................ 528/28, 70, 76; 473/354, 365, 374, 378; 525/127, 129, 130, 261

(56) References Cited

U.S. PATENT DOCUMENTS

| | | | |
|---|---|---|---|
| 4,675,361 A | 6/1987 | Ward, Jr. ...................... 525/92 |
| 5,221,724 A | 6/1993 | Li et al. ........................ 528/28 |
| 5,428,123 A | 6/1995 | Ward et al. ................... 128/28 |
| 5,461,134 A | 10/1995 | Leir et al. ...................... 528/14 |
| 5,530,083 A | 6/1996 | Phelps et al. ................. 528/25 |
| 5,589,563 A | 12/1996 | Ward et al. ................... 428/44 |
| 5,800,286 A | * 9/1998 | Kakiuchi et al. ........... 473/365 |
| 5,863,627 A | 1/1999 | Szycher et al. ............ 428/36.8 |
| 5,976,035 A | 11/1999 | Umezawa et al. .......... 473/364 |
| 6,117,024 A | * 9/2000 | Dewanjee .................... 473/351 |
| 6,159,110 A | 12/2000 | Sullivan et al. ............. 473/374 |
| 6,162,134 A | 12/2000 | Sullivan et al. ............. 473/373 |
| 6,204,331 B1 | 3/2001 | Sullivan et al. ............. 525/221 |
| 6,207,784 B1 | 3/2001 | Rajagopalan ................ 528/71 |
| 6,251,991 B1 | * 6/2001 | Takesue et al. ............... 525/66 |
| 6,267,694 B1 | * 7/2001 | Higuchi et al. ............. 473/374 |

FOREIGN PATENT DOCUMENTS

WO    WO-00/06257    * 2/2000

OTHER PUBLICATIONS

Thain, SCIENCE and GOLF IV ,P.319–327, Jul. 2002.*

* cited by examiner

Primary Examiner—David J. Buttner
(74) Attorney, Agent, or Firm—D. Michael Burns

(57) ABSTRACT

A golf ball comprising a cover and a core, and at least one intermediate layer interposed between the cover and the core, wherein the cover is formed from a blend comprising of a segmented polyurethane elastomer copolymers of polyether (or ester)-ester and polyether (or ester)-amide.

15 Claims, 1 Drawing Sheet

GOLF BALL COVER WITH SEGMENTED POLYURETHANE

CROSS-REFERENCE TO RELATED APPLICATION

This application claims priority to U.S. Provisional Application No. 60/346,226, filed Oct. 22, 2001.

FIELD OF THE INVENTION

The present invention relates to golf balls and more specifically, to the use of segmented polyurethane materials in golf ball layers for improving golf ball physical properties.

BACKGROUND OF THE INVENTION

Conventional golf balls can be divided into two general types or groups: solid balls and wound balls. The difference in play characteristics resulting from these different types of constructions can be quite significant.

Balls having a solid construction are generally most popular with the average recreational golfer because they provide a very durable ball while also providing maximum distance. Solid balls are generally made with a single solid core, usually made of cross-linked rubber, which is encased by a cover material. Typically, the solid core is made of polybutadiene which is chemically cross-linked with zinc diacrylate, and/or similar cross-linking agents, and is covered by a tough, cut-proof, blended cover. The cover is generally a material such as SURLYN®, an ionomer resin produced by DuPont. Such a combination imparts a high initial velocity to the ball that results in improved distance. Because these materials are very rigid, two-piece balls have a hard "feel" when struck with a club. Likewise, due to their hardness, these balls have a relatively low spin rate, which provides greater distance.

Wound balls typically have either a solid rubber or liquid center core around which many yards of a stretched elastic thread or yarn are wound. The wound core is then covered with a durable cover material such as ionomer or polyurethane. Wound balls are generally softer and provide more spin, which enables a skilled golfer to have control over ball flight. Particularly, with approach shots into the green, the high spin rate of soft, wound balls enables the golfer to stop the ball very near its landing position.

The design and technology of golf balls has advanced to the point that the United States Golf Association has instituted a rule prohibiting the use of any golf ball, in a USGA sanctioned event, that can achieve an initial velocity of 255 ft/s, when struck by an implement having a velocity of 143 ft/s (referred to hereinafter as "the USGA test").

Manufacturers place a great deal of emphasis on producing golf balls that consistently achieve the highest possible velocity in the USGA test without exceeding the limit, which are available with a range of different properties and characteristics, such as velocity, spin, and compression. Thus, a variety of different balls are available to meet the needs and desires of a wide range of golfers.

Regardless of the form of the ball, players generally seek a golf ball that delivers maximum distance, which requires a high initial velocity upon impact. Therefore, in an effort to meet the demands of the marketplace, manufacturers strive to produce golf balls with high initial velocities.

As a result, golf ball manufacturers are continually searching for new ways in which to provide golf balls that deliver the maximum performance for golfers at all skill levels, and seek to discover compositions that provide the performance of a high compression ball with lower compression.

The physical characteristics of a golf ball are determined by the combined properties of the core, any intermediate layers, and the cover. These, in turn, are determined by the chemical compositions of each. The composition of some balls will provide for increased distance. Other compositions provide for improved spin. Manufacturers are constantly looking to develop the ideal materials. Thermoplastic polyurethane urea for example, have been examined for their innate ability to provide material having very high tensile strengths, which is a very desired property in the make-up of a golf ball.

Segmented polyurethanes are elastomers with a solvent base. They can be processed by methods that involve combining an aromatic polyetherurethane urea with a soft segment of polycarbonate and a hard segment of diphenylmethane diisocyanate and mixed diamines. Hard segments are usually the reaction product of an aromatic diisocyanate and a low molecular weight, chain-extending dialcohol or diol. Soft segments may be synthesized from polycarbonate polyols with terminal hydroxyl (—OH) groups. The hydroxyl creates a urethane group, while the reaction between isocyanates and existing urea groups will form allophanate groups that can produce minor amounts of covalent cross-linking. When heated, the hydrogen-bonded hard segments and any allophanate cross-links, dissociate to allow the polymer to melt and flow. Dissolution in a polar solvent can also disrupt the hydrogen bonds that hold together the hard segments on adjacent chains. Once these virtual cross-links are broken, the polymer can be fabricated into golf ball layers. Upon cooling or solvent evaporation, the hard segments de-mix from the soft segments to re-associate by hydrogen bonding. This restores the original mechanical properties of the thermoplastic elastomer. Conventional segmented polyurethanes generally have excellent physical properties, combining high elongation and high tensile strength, but they are a solvent by nature. By reacting a primary amine first with the isocyanate to form a secondary amine and then the remaining hydrogen on the secondary amine can react a second time with another isocyanate moiety to form a tertiary amine. This second reaction forms a cross-link, which leads to a thermoset material. Secondary amines cannot form secondary reactions, therefore, the urea group does not react with additional isocyanate to form cross-links, and the product is a thermoplastic, which is amine cured.

Therefore, there exists a need for a golf ball comprising a segmented polyurethane for improved golf ball performance. By varying the urea hard segment during synthesis a whole family of polymers of related-chemistry can be produced having a wide range of hardness, modulus, tensile-strength properties and elongation.

SUMMARY

The invention is related to a use of a segmented polyurethane comprising urea in the hard segment for the formation of a golf ball core, cover, or intermediate layer.

A first embodiment is a golf ball comprising a core and a cover, at least one of which is formed from a segmented polyurethane comprising an aromatic urea hard segment and a polycarbonate based soft segment. BioSpan® C, is an example of a suitable segmented polyurethane material and is commercially available from the Polymer Technology Group, Inc.

Another embodiment of the invention incorporates a segmented polyurethane comprising on aromatic urea hard segment and a polyether based soft segment. An example is BioSpan® SPU, which is a registered trademark for a segmented polyurethane material commercially available from the Polymer Technology Group, Inc.

Most preferable, the segmented PU of the invention is an intermediate layer. Other embodiments of the invention blend the block copolymer of polycarbonate-polyurea with at least one thermoplastic or thermoset polymer including ionomers and copolymers including highly neutralized polymers, epoxies, styrenic and olefinic homo- and copolymers (including metallocenes and single-site); polyamides; polyesters; polydienes; block copolymers of polyether (or ester)-ester and polyether (or ester)-amides. Examples of these may be found in U.S. patents issued to Ward et al. U.S. Pat. Nos. 4,675,361; 5,428,123; 5,589,563; and 5,863,627, Li et al. U.S. Pat. No. 5,221,724; and Leir et al. U.S. Pat. No. 5,461,134, which are incorporated by reference herein in their entirety.

The invention is preferably a two-piece or a multi-layered golf ball having a coefficient of restitution greater than about 0.7 and measured at an incoming velocity of 125 ft/s, and an Atti compression of at least about 50. The intermediate layer is the preferred use of the invention, and comprises segmented polyurethane such that it has a material tensile strength of greater than about 3,000 psi.

Surface modifying end groups (SMEs) are surface-active oligomers covalently bonded to the base polymer during synthesis. The invention can include SMEs that will control surface chemistry without compromising the bulk properties of the polymer. Key surface properties, such as abrasion resistance, are permanently enhanced without additional post-fabrication treatments or topical coatings.

DETAILED DESCRIPTION OF EMBODIMENTS

Figure 1:
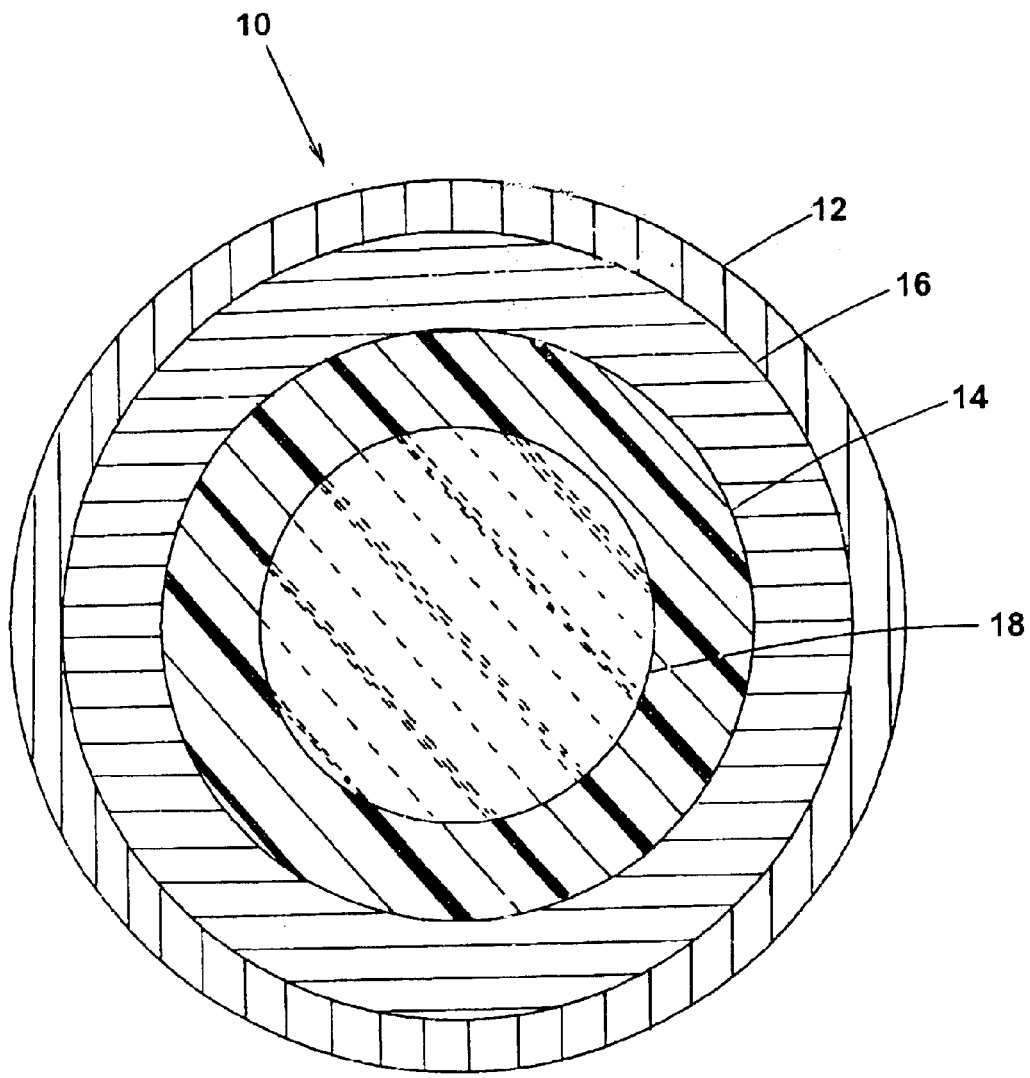
FIG. 1 is a cross-sectional view of a golf ball of the present invention.

The golf ball 10 of the invention comprises a core 14 of at least one layer, a cover 12 of at least one layer disposed concentrically about the core 14, and may optionally include at least one intermediate layer 16 between the cover 12 and the core 14. Any of these layers may contain thermoplastic urethane copolymers having polycarbonate in the soft segment of the copolymer, but preferably, the intermediate layer may also include a tensioned elastomeric material. The center 18 of core may also contain a intermediate layer that is solid, hollow, fluid filled, or gel filled.

Segmented polyurethanes, available today include BioSpan®, a trademark of the Polymer Technology Group, Inc. Polymers have been made that show the material having good oxidative stability, excellent mechanical strength and abrasion resistance, and very important in golf ball manufacture: superior optical properties. Ultimate tensile strengths for BioSpan® compounds may exceed 10,000 psi.

U.S. Pat. No. 5,756,632 issued to Ward, describes how commercially available BioSpan® is processed. BioSpan®C is segmented polyurethane which is formed as the reaction product of a hydroxyl terminated polycarbonate, an aromatic diisocyanate, and a low molecular weight diamine used as a chain extender. BioSpan® SPU is segmented polyether which is formed as the reaction product of a hydroxyl terminated polyether, an aromatic diisocyante, and a low molecular weight diamine. In a preferred embodiment, the reaction of isocyanate groups with low molecular weight difunctional reagents leads to chain extension, and to the formation of hard segments connecting the polycarbonate soft segments through urethane groups. If the chain extender is a diol, the hard segment has repeat units connected by urethane groups, whereas if it is a diamine, the hard segment comprises urea groups. In the later case, the resulting polymer is referred to as a polyurethaneurea. Polyurethane ureas are highly phase-separated elastomers that are generally manufactured in solution unless the diamine chain extender is completely replaced by water. When the total content of hard segment is lowered, useful urea-containing urethanes are obtained. These are elastomers approaching natural rubber characteristics. The polyurethane ureas exhibit good phase separation, low hardness and extreme toughness.

Further compositions may also be added to the segmented polyurethane components of the invention, such as, SMEs, suitable compatibilizers, coloring agents, reaction enhancers, cross-linking agents, blowing agents, dyes, lubricants, fillers (including density modifying fillers), excipients, process aids and other compounds commonly added to polymeric materials and/or golf ball compositions.

Surface modifying end groups (SMEs) are surface-active oligomers bonded to the base polymer during synthesis. SMEs, that include silicone, sulfonate, flurocarbon, polyethylene oxide and hydrocarbon groups, control surface chemistry without compromising the bulk properties of the polymer. Key surface properties, such as abrasion resistance, are permanently enhanced without the additional post-fabrication treatments or topical coatings. The addition of SMEs provides a series of base polymers that can actually achieve a desired surface chemistry without the use of additives. This leaves the original polymer backbone intact so that the polymer retains strength and processing ability. Having all the polymer chains carrying the surface-modifying moiety eliminates many of the potential problems associated with additives.

The composition of any golf ball component, which does not contain segmented polyurethane of the present invention disclosed herein, can be any such composition known to those of ordinary skill in the art. Such a composition may be readily selected by those of ordinary skill in the art.

The resultant golf balls typically have a coefficient of restitution of greater than about 0.7, preferably greater than about 0.75, and more preferably greater than about 0.78 when measured at an incoming velocity of 125 ft/sec. The golf balls also typically have an ATTI compression of at least about 40, preferably from about 50 to 120, and more preferably about 60 to 100. As used herein, the term "compression" means as measured by an ATTI Compression Gauge. These gauges are well known to those of ordinary skill in the art and are commercially available from Atti Engineering Corp. of Union City, N.J.

The present invention relates to golf balls of any size. While USGA specifications limit the size of a competition golf ball to more than 1.68 inches in diameter, golf balls of any size can be used for leisure golf play. The preferred diameter of golf balls is from about 1.68 inches to about 1.76 inches. A diameter of from about 1.68 inches to about 1.74 inches is most preferred. The core of the ball has a diameter from about 1.0 to about 1.62 inches. The cover of a golf ball may typically have a thickness of at least about 0.03 inches. The cover of the present invention is preferably about 0.02 to 0.125 inches, and more preferably from about 0.03 to 0.10 inches. Golf balls also typically have at least about 60 percent dimple coverage, preferably at least about 70 percent dimple coverage, of the surface area. The cover layer has a Shore D hardness of at least about 20 and preferably between about 30 and 65. The golf ball of the present invention has a compression of less than about 120.

Golf balls of the present invention can be manufactured by numerous methods. The core may be made by methods well known in the art, by using either a conventional wound core construction, or a conventional solid construction of one or more layers. The wound core construction can be either a solid rubber-based center or a liquid filled center, around which a length of elastic thread is wound. A conventional solid construction preferably comprises a cis 1,4 polybutadiene rubber that has been cross-linked with a metal salt of an unsaturated fatty acid such as zinc diacrylate. A conventional multi-layer construction may include multi-layered cores of different polybutadiene based materials to form inner and outer layers.

These core constructions are then covered using conventional compression injection molding or casting techniques with a cover formulation containing a segmented polyurethane such as BioSpan® C which contains polycarbonate in the soft segment and a urea hard segment. BioSpan® SPU contains polyether in the soft segment. There are many methods to utilize this material. One example includes BioSpan® C being formed over a golf core by a one-shot (or alternately a pre-polymer approach) process. This is done, for example, by mixing a soft segment of polycarbonate polyol (PC) with a hard segment of 4,4'-diphenylmethane diisocyanate (MDI), ethylene diamine (ED) and 1,3 cyclohexanediamine (CHD), and a typical endgroup, such as dodecylamine (DDA). The covers are preferably between about 0.05 and 0.10 inches thick.

In another embodiment, the copolymers of either segmented polycarbonate polyurethane or polyether polyurethane is blended with at least one thermoplastic or thermoset polymer, including ionomers and their acid ionomers and including highly neutralized polymers; polyolefins; polyacrylates; polyamides; polyphenylene oxides; polyisoprenes; block copoly (ethers or ester-amides); block copoly (ethers or ester-esters); polysulfones, reaction injection moldable thermoplastic and thermoset polymers; block copolymers of styrene-butadiene and its hydrogenated derivatives; dynamically vulcanized ethylene-propylene rubbers; polyvinylidenefluorides; acrylonitrile-butadiene styrene copolymers; epoxy resins; polystyrenes; acrylics; polyethylenes; polybutadienes; and polyesters.

Another embodiment comprises a core, an inner cover having a flexural modulus greater than 50,000 psi, and a cover comprised of segmented polycarbonate-urethane elastomers. The cover preferably has thickness of between about 0.02 to 0.05 inches and has initial modulus of less than 10,000 psi. In another embodiment, the initial modulus is greater than 10,000 psi. The segmented polyurethane elastomer preferably has an ultimate elongation of at least about 40% to 1000%, preferably from about 400% to 800%.

An alternative embodiment comprises a core, a cover, and an intermediate layer comprising the segmented polycarbonate-urethane elastomers. The intermediate layer preferably has a thickness of about 0.02 to 0.08 inches and has initial modulus of less than about 10,000 psi, preferably from about 300 to 10,000 psi.

In one embodiment, the core comprises polybutadiene rubber, and the cover and intermediate layers comprise thermoplastic silicone-urethane copolymers. The core preferably has a diameter of at least about 1.5 inches. Preferably, the intermediate layer thickness is about 0.02 to 0.08 inches, and the combined thickness of the cover and the intermediate layer is of less than about 0.1 inches. The polybutadiene rubber composition of the core preferably comprises at least about 2.2 pph of a halogenated organosulfur compound, preferably zinc pentachlorothiophenol.

While it is apparent that the invention disclosed herein is well calculated to fulfill the objects stated above, it will be appreciated that numerous modifications and embodiments may be devised by those skilled in the art. Such modifications may include density modifying additives, UV absorbing additives, hindered amine light stabilizers, optical brighteners, foamed layers, moisture barrier layer, etc. In addition to its use in a golf ball, the present invention can be used in other golf equipment such as inserts in golf clubs. Therefore, it is intended that the appended claims cover all such modifications as falling within the true spirit and scope of the present invention.

What is claimed is:

1. A golf ball comprising:
   a core of at least one layer;
   a cover of at least one layer disposed concentrically about the core;
   the cover of at least one layer comprises a blend of segmented polycarbonate-urethane copolymer with at least one of a thermoset polymer or a thermoplastic polymer selected from a group consisting of highly neutralized acid polymers, polyphenylene oxide, polysulfones, polyvinylidene fluoride, and epoxy resins;
   the segmented polycarbonate-urethane copolymer having a surface-active oligomer bonded to the base polymer during synthesis; and
   the core of at least one layer is a polybutadiene comprising at least about 2.2 pph of a halogenated organosulfur compound or the salt thereof.

2. The golf ball according to claim 1, wherein the ball further comprises at least one intermediate layer disposed between the cover and the core.

3. The golf ball according to claim 2, wherein at least one of the intermediate layers comprises a tensioned elastomeric material.

4. The golf ball according to claim 2, wherein at least one of the intermediate layers comprises a thermoplastic material having a flexural modulus of at least 50,000 psi.

5. The golf ball according to claim 1, wherein the cover has a thickness of from 0.02 to 0.125 inches.

6. The golf ball according to claim 1, wherein the golf ball has a compression of less than 120.

7. A golf ball comprising:
   a core of at least one layer;
   a cover of at least one layer disposed concentrically about the core, and the cover having a Shore D hardness of between 30 and 65;
   at least one intermediate layer interposed between the cover and the core;
   the cover of at least one layer or the at least one intermediate layer comprising a blend of segmented polycarbonate-urethane copolymer with at least one of a thermoset polymer or a thermoplastic polymer selected from a group consisting of highly neutralized acid polymers, polyphenylene oxide, polysulfones, polyvinylidene fluoride, and epoxy resins;
   a surface-active oligomer bonded to the polycarbonate-urethane copolymer during synthesis, and the core of at least one layer is a polybutadiene comprising at least about 2.2 pph of a halogenated organosulfur compound or the salt thereof.

8. The golf ball according to claim 7, wherein the segmented polycarbonate-urethane copolymer comprises as the reaction product of a hydroxyl terminated polycarbonate, an aromatic diisocyanate, and a low molecular weight diamine.

9. The golf ball according to claim 7, wherein the cover has a thickness of about 0.02 to about 0.125 inches.

10. The golf ball according to claim 7, wherein the thickness of the at least one intermediate layer is about 0.02 to about 0.08 inches.

11. The golf ball according to claim 7, wherein the core has a diameter of at least about 1.55 inches.

12. The golf ball according to claim 11, wherein the core comprises a center that is solid, hollow, fluid filled, or gel-filled.

13. The golf ball according to claim 7, wherein the intermediate layer comprises a thermoplastic material having a flexural modulus of at least 50,000 psi.

14. The golf ball according to claim 7, wherein the cover layer has a thickness of from about 0.01 to 0.12 inches.

15. The golf ball according to claim 7, wherein the golf ball has a compression of less than about 120.

* * * * *